United States Patent
Kim (10) Patent No.: US 9,218,779 B2
(45) Date of Patent: Dec. 22, 2015

(54) LIQUID CRYSTAL DISPLAY DEVICE WITH IMPROVED INTEGRATED TOUCH PANEL AND DRIVING METHOD THEREOF

(71) Applicant: LG Display Co., Ltd., Seoul (KR)

(72) Inventor: TaeHwan Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 374 days.

(21) Appl. No.: 13/680,204

(22) Filed: Nov. 19, 2012

(65) Prior Publication Data

US 2013/0335367 A1 Dec. 19, 2013

(30) Foreign Application Priority Data

Jun. 15, 2012 (KR) ........................ 10-2012-0064296

(51) Int. Cl.
*G06F 3/041* (2006.01)
*G09G 3/36* (2006.01)
*G06F 3/044* (2006.01)

(52) U.S. Cl.
CPC .............. *G09G 3/3696* (2013.01); *G06F 3/044* (2013.01); *G09G 3/3677* (2013.01); *G09G 2300/0408* (2013.01); *G09G 2310/0286* (2013.01); *G09G 2310/08* (2013.01)

(58) Field of Classification Search
CPC ........................... G09G 3/3611; G09G 3/3674
USPC ......................................... 345/100, 173, 174
See application file for complete search history.

(56) References Cited

U.S. PATENT DOCUMENTS

| 8,487,890 | B2 * | 7/2013 | Juan et al. ..................... 345/173 |
| 2005/0264514 | A1 | 12/2005 | Kim et al. |
| 2009/0256794 | A1 * | 10/2009 | Jang et al. ..................... 345/100 |
| 2012/0105393 | A1 | 5/2012 | Tan et al. |
| 2013/0300681 | A1 * | 11/2013 | Jamshidi-Roudbari et al. ............................ 345/173 |
| 2013/0307817 | A1 | 11/2013 | Kim |

FOREIGN PATENT DOCUMENTS

| CN | 102236449 A | 11/2011 |
| CN | 102467891 A | 5/2012 |
| CN | 103425365 A | 12/2013 |

OTHER PUBLICATIONS

The First Office Action dated Feb. 3, 2015 from The State Intellectual Property Office of the People's Republic of China in counterpart Chinese application No. 201210524135.9.
The Second Office Action dated Oct. 9, 2015 from The State Intellectual Property Office of the People's Republic of China in counterpart Chinese application No. 201210524135.9.

* cited by examiner

*Primary Examiner* — Roy Rabindranath
(74) *Attorney, Agent, or Firm* — Morgan, Lewis & Bockius LLP (57) ABSTRACT

Provided are a Liquid Crystal Display (LCD) device and a driving method thereof. A method of driving a liquid crystal display (LCD) device includes: transferring a pull-up signal to a corresponding gate line formed in an in-cell touch panel during an image output period in one frame and, after the pull-up signal is outputted during the image output period, turning on a first pull-down transistor or a second pull-down transistor to transfer a pull-down signal to the gate line; and detecting a touch by using a touch electrode formed in the in-cell touch panel while the stage turns on the first pull-down transistor and the second pull-down transistor to transfer the pull-down signal to the corresponding gate line, during a touch sensing period in the one frame, wherein, the stages sequentially transfer the pull-up signal to the respective gate lines.

8 Claims, 11 Drawing Sheets

FIG. 1

[ Related Art ]

FIG. 2

[ Related Art ]

LIQUID CRYSTAL DISPLAY DEVICE WITH IMPROVED INTEGRATED TOUCH PANEL AND DRIVING METHOD THEREOF

CROSS-REFERENCE TO RELATED APPLICATIONS

This application claims the benefit of the Korean Patent Application No. 10-2012-0064296 filed on Jun. 15, 2012, which is hereby incorporated by reference as if fully set forth herein.

BACKGROUND

1. Field of the Invention

The present invention relates to a Liquid Crystal Display (LCD) device and a driving method thereof, and more particularly, to an LCD device including a liquid crystal panel with a built-in touch panel and a driving method thereof.

2. Discussion of the Related Art

LCD devices adjust the light transmittance of liquid crystal with an electric field to display an image. To this end, the LCD devices include a liquid crystal panel in which a plurality of pixels are arranged in a matrix type, and a driver for driving the liquid crystal panel.

Methods, which input a control signal into an electronic product with LCD devices mounted thereon, include a method using a touch panel and a method using buttons. Recently, the method using the touch panel is widely used.

Touch panels may be formed in various types depending on an arrangement position. That is, the touch panels may be formed in an on-cell type in which the touch panel is adhered to a top of a color filter substrate, an in-cell type in which two electrodes configuring the touch panel are formed in a thin film transistor (TFT) substrate configuring a liquid crystal panel, or a hybrid type in which one of two electrodes configuring the touch panel is formed in the TFT substrate of the liquid crystal panel and the other is formed at the top of the color filter substrate. Here, a liquid crystal panel including the in-cell type touch panel or the hybrid type touch panel is referred to as an in-cell touch panel.

Figure 1:
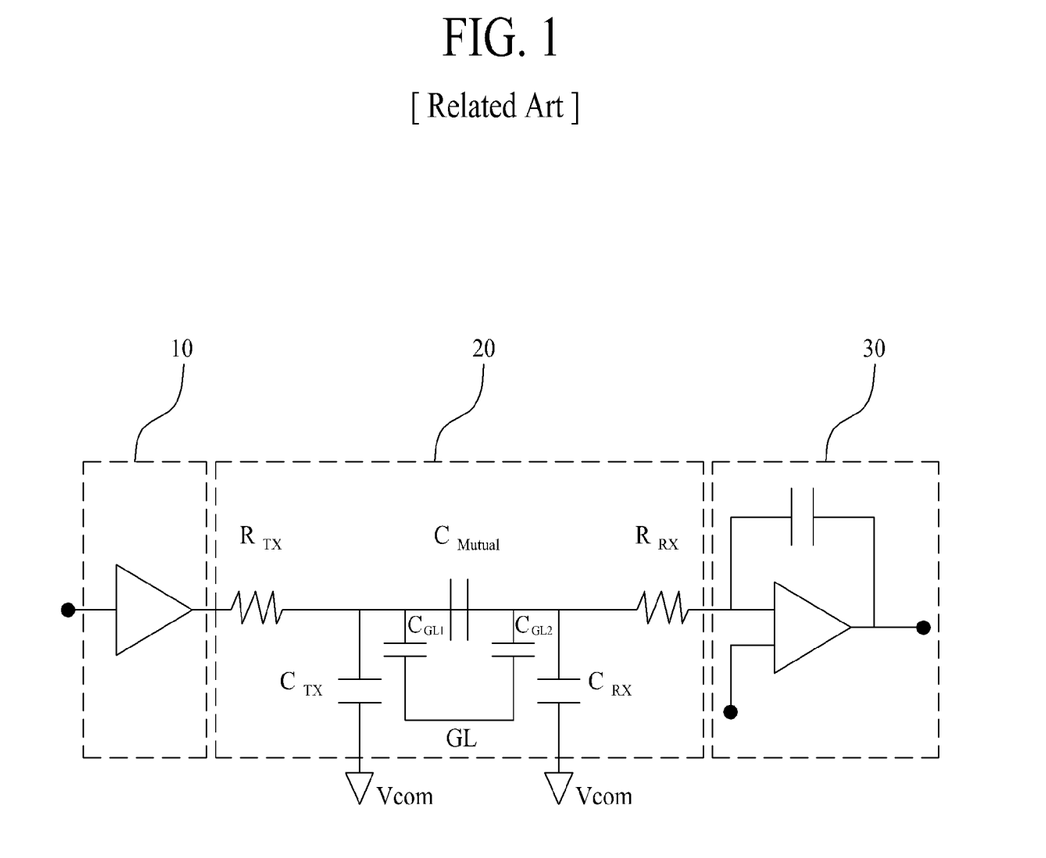
FIG. 1 is an exemplary diagram illustrating an equivalent circuit of a touch panel applied to a related art in-cell touch panel.
Figure 2:
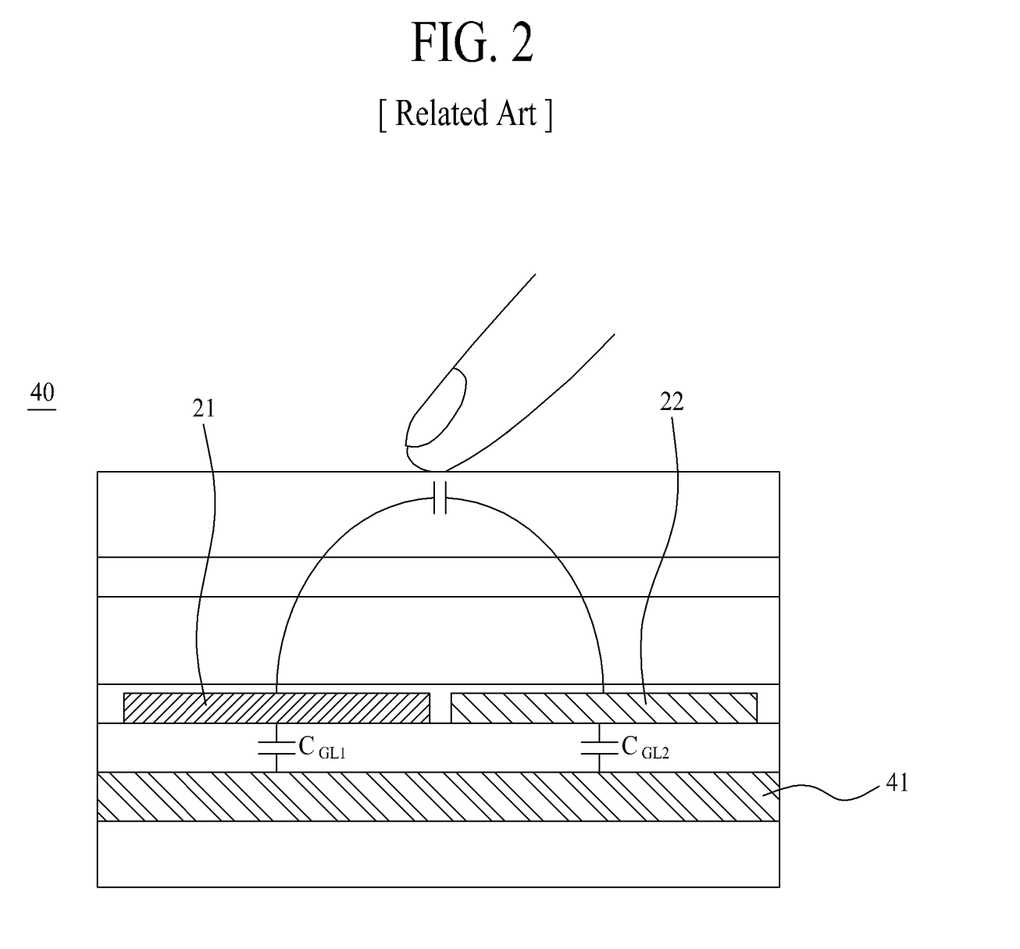
FIG. 2 is an exemplary diagram illustrating capacitance generated between a touch electrode and a gate line in the related art in-cell touch panel.

FIG. 1 is an exemplary diagram illustrating an equivalent circuit of a touch panel applied to a related art in-cell touch panel, and FIG. 2 is an exemplary diagram illustrating capacitance generated between a touch electrode and a gate line in the related art in-cell touch panel.

An equivalent circuit of a touch panel 20 applied to the related art in-cell touch panel, as shown in FIG. 1, may include a driving signal resistor RTX connected to a touch driver 10 that applies a driving pulse (Tx signal) to the touch panel 20, a sensing signal resistor R connected to a sensing signal receiver 30, and a plurality of capacitance $C_{Mutual}$, $C_{TX}$ and $C_{RX}$ that are connected in parallel or series.

In addition to the above-described capacitances, as shown in FIGS. 1 and 2, the related art touch panel 20 may further include gate line capacitances $C_{GL1}$ and $C_{GL2}$ that are generated between a gate line (GL) 41 and a driving electrode 21 or a receiving electrode 22 configuring a touch electrode. The gate line capacitances $C_{GL1}$ and $C_{GL2}$ may cause noise to the driving electrode 21 and the receiving electrode 22 to deteriorate a touch determination function of a touch sensing unit including the sensing signal receiver 30. A mathematical analysis on this will be provided below.

A portion (a) of Equation (1) is an equation for determining whether there is a touch with no consideration of a gate line capacitance, and a portion (b) of Equation (1) is an equation for determining whether there is a touch in consideration of the gate line capacitance.

$$\text{(a)} \quad \frac{\Delta C_m}{C_i} \qquad \text{(b)} \quad \frac{\Delta C_m}{C_i + C_{GL}} \qquad (1)$$

where $\Delta C_m$ denotes an amount of change in a capacitance generated by a touch, $C_{GL}$ denotes a gate line capacitance generated between the gate line and the touch electrodes, and $C_i$ denotes an initial capacitance generated in the touch panel.

In Equation (1), it can be seen that when the amount of changed capacitance ($\Delta C_m$) in the portion (a) is equal to that in the portion (b), a value of the amount of changed capacitance ($\Delta C_m$) divided by the initial capacitance ($C_i$) and the gate line capacitance ($C_{GL}$) is less than a value of the amount of changed capacitance divided by the initial capacitance ($C_i$). Here, as the gate line capacitance ($C_{GL}$) increases, an amount of change in a signal detected by the sensing signal receiver 30 becomes less, and thus, a touch sensitivity of the touch sensing unit including the sensing signal receiver 30 becomes lower.

Generally, in in-cell touch panel 40, the driving electrode 21 and the receiving electrode 22 share the same gate line 41. Therefore, the related art in-cell touch panel has the following limitations.

First, when a driving pulse is generated, there is extra charge transferred through the gate line 41 shared by the driving electrode 21 and the receiving electrode 22, and the size of the extra charge is changed according to the resistance of the gate line that maintains a constant voltage.

That is, as the resistance of the gate line becomes lower, characteristic in which the gate line intends to maintain a specific voltage increases. Therefore, even though there is a coupling capacitance (gate line capacitance ($C_{GL}$)) between the gate line and the driving electrode or the receiving electrode, the touch sensitivity is enhanced because the extra charge transferred from the driving electrode to the receiving electrode through the gate line is reduced.

However, in the in-cell touch panel of the related art, a separate configuration and method for decreasing the resistance of the gate line are not proposed.

Second, in a Gate-In Panel (GIP) type LCD device in which a gate driver is formed in the in-cell touch panel, generally, while a scan signal (pull-up signal) is not inputted to the gate line during one frame, a pull-down signal for turning off switching transistors formed in the gate line is continuously inputted to the gate line. In this case, if one pull-down transistor continuously inputs the pull-down signal to the gate line, the performance of the pull-down transistor is reduced.

Therefore, the GIP type LCD device alternately drives two pull-down transistors to input the pull-down signal into the gate line, in each frame.

However, since different pull-down transistors input the pull-down signal to the gate line in each frame, due to a characteristic difference between pull-down transistors, the characteristic of a resistance for maintaining the gate line is changed whenever an alternation period is changed. The change in the resistance characteristic of the gate line changes the size of the extra charge transferred from the driving electrode to the receiving electrode through the gate line, and thus, changes touch characteristic, causing the reduction in a function of detecting whether there is a touch.

SUMMARY

Accordingly, the present invention is directed to a Liquid Crystal Display (LCD) device and a driving method thereof that substantially obviate one or more problems due to limitations and disadvantages of the related art.

An aspect of the present invention is directed to an LCD device and a driving method thereof, which alternately transfer pull-down signals generated by different pull-down transistors to gate lines during an image output period, and turn on the different pull-down transistors to transfer the pull-down signals to the gate lines during a touch sensing period.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a method of driving a liquid crystal display (LCD) device, the method comprising: transferring, by a stage corresponding to each of a plurality of gate lines, a pull-up signal to a corresponding gate line formed in an in-cell touch panel during an image output period in one frame and, after the pull-up signal is outputted during the image output period, turning on a first pull-down transistor or a second pull-down transistor to transfer a pull-down signal to the gate line; and detecting, by a touch sensing unit, a touch by using a touch electrode formed in the in-cell touch panel while the stage turns on the first pull-down transistor and the second pull-down transistor to transfer the pull-down signal to the corresponding gate line, during a touch sensing period in the one frame, wherein, the stages sequentially transfer the pull-up signal to the respective gate lines.

In another aspect of the present invention, there is provided a Liquid Crystal Display (LCD) device, comprising: an in-cell touch panel with a built-in touch panel; a gate driver formed in the In-cell touch panel, comprising a plurality of stages respectively corresponding to a plurality of gate lines formed in the in-cell touch panel, and sequentially transferring a plurality of pull-up signals to the respective gate lines during an image output period in one frame; a touch sensing unit driving the touch panel to detect whether there is a touch, during a touch sensing period in the one frame; and a timing controller controlling the gate driver and the touch sensing unit, wherein, each of the stages transfers a pull-up signal to a corresponding gate line during the image output period, and transfers a pull-down signal to the corresponding gate line by turning on a first pull-down transistor or a second pull-down transistor after the pull-up signal is outputted, during the image output period; and each of the stages turns on the first pull-down transistor and the second pull-down transistor to transfer a pull-down signal to a corresponding gate line during the touch sensing period.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 4 is an exemplary diagram illustrating an internal configuration of a driver of FIG. 3a;

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Figure 3A:
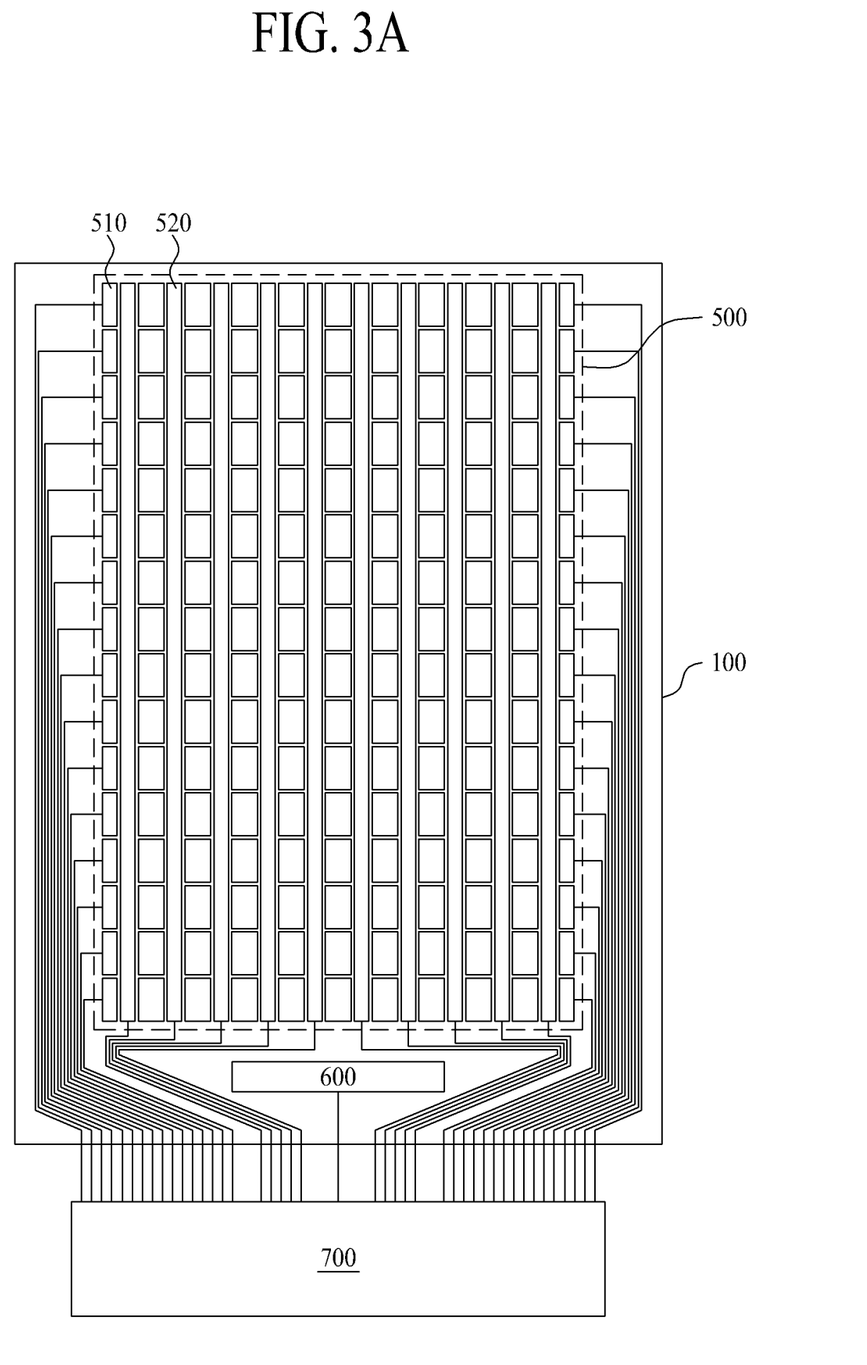
FIGS. 3a and 3b are exemplary diagrams illustrating a configuration of an LCD device according to an embodiment of the present invention.
Figure 3B:
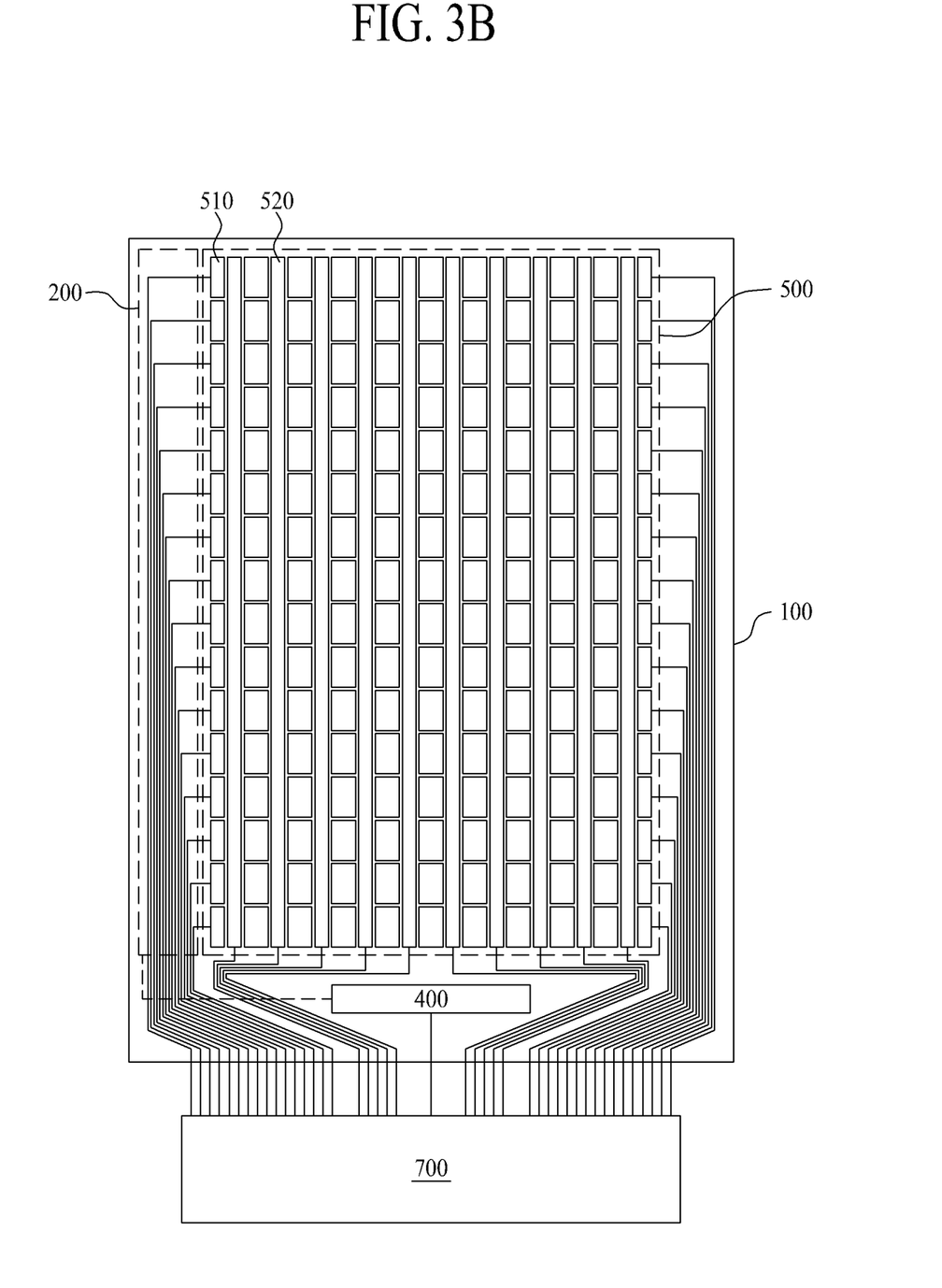
Figure 4:
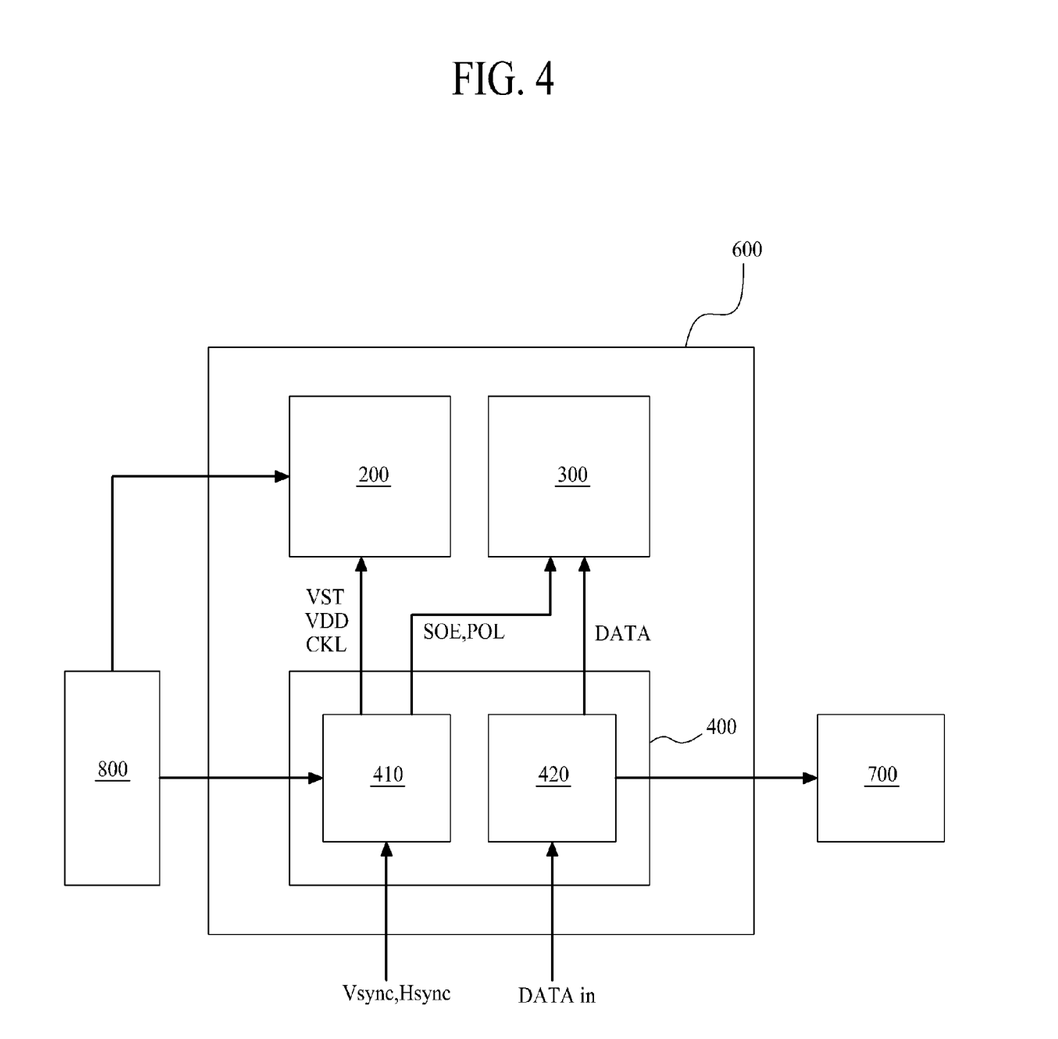
Figure 5:
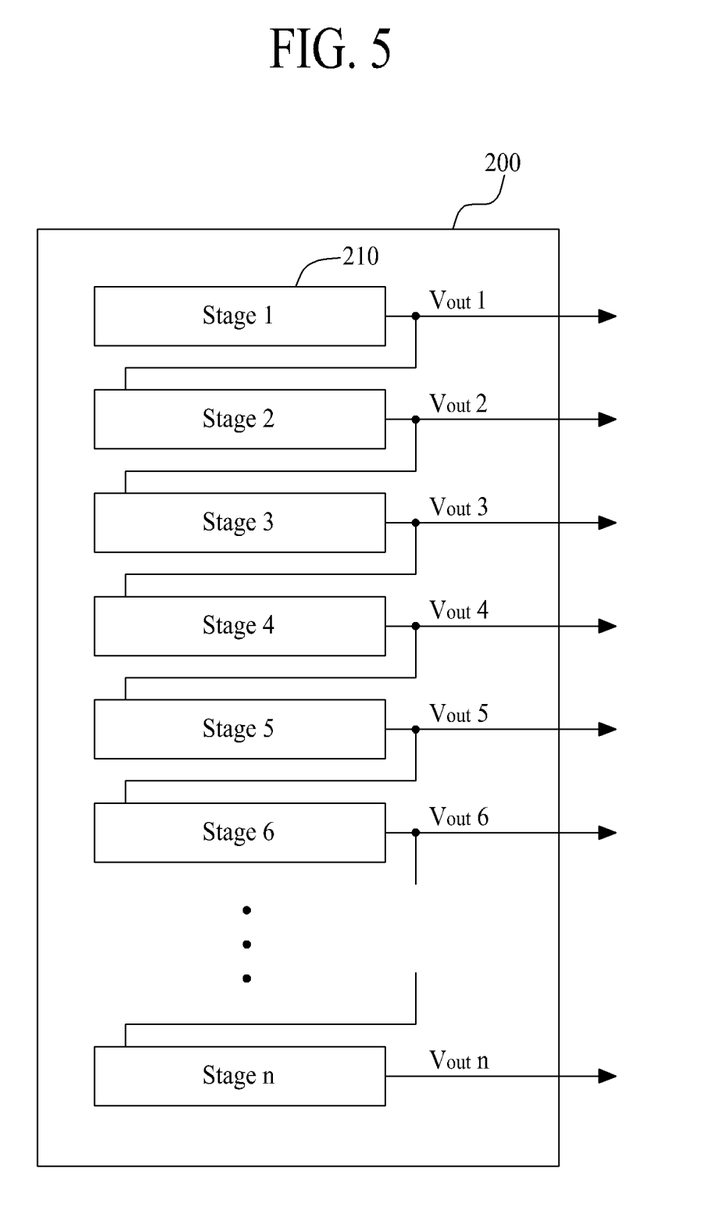
FIG. 5 is an exemplary diagram illustrating an internal configuration of a gate driver of FIG. 4.

FIGS. 3a and 3b are exemplary diagrams illustrating a configuration of an LCD device according to an embodiment of the present invention, FIG. 4 is an exemplary diagram illustrating an internal configuration of a driver of FIG. 3a, and FIG. 5 is an exemplary diagram illustrating an internal configuration of a gate driver 200 of FIG. 4.

The present invention relates to an LCD device using a hybrid in-cell type touch panel or an in-cell type touch panel. The in-cell type touch panel or the hybrid in-cell type touch panel forms a portion of a liquid crystal panel configured with a color filter substrate and a TFT substrate. Therefore, in the following description, a liquid crystal panel including the in-cell type touch panel or the hybrid in-cell type touch panel is referred to as an in-cell touch panel. A touch electrode, which includes a driving electrode and a receiving electrode and is used for detecting whether the in-cell touch panel is touched, is used even as a common electrode receiving a common voltage applied to the in-cell touch panel during an image output period.

One of driving types of the in-cell touch panel is a capacitive type. The capacitive type is again categorized into a self capacitive type and a mutual type. Here, the mutual type is applied to the LCD device according to the present invention.

The LCD device according to the present invention uses a Gate In Panel (GIP) type in which a gate driver driving a gate line is formed in the in-cell touch panel. Particularly, the LCD device includes stages formed in the gate driver, and each of the stages alternately uses two pull-down transistors to transfer a pull-down signal to a gate line when a scan signal (a pull-up signal) is not applied.

That is, the present invention relates to the LCD device including a gate driver formed in the in-cell touch panel using the mutual type, and, as shown in FIGS. 3a and 4, includes an in-cell touch panel 100 with a built-in touch panel 500, a gate driver 200 formed in the In-cell touch panel 100, comprising a plurality of stages 210 respectively corresponding to a plurality of gate lines formed in the in-cell touch panel, and sequentially transferring a plurality of pull-up signals to the respective gate lines during an image output period in one frame, a touch sensing unit 700 driving the touch panel 500 to detect whether there is a touch, during a touch sensing period in the one frame, a timing controller 400 controlling the gate driver and the touch sensing unit, and a power supply 800 supplying power for driving the above element. A common voltage generator for generating a common voltage may be formed in the power supply 800.

First, the in-cell touch panel 100 may include a TFT substrate in which a plurality of pixels are respectively formed in a plurality of areas defined by the intersection of a plurality of gate lines and data lines, a color filter substrate in which a color filter is formed, and the touch panel 500 which is built in a space between the TFT substrate and the color filter substrate for detecting a touch and supplying the pixels with a common voltage.

The touch panel 500 built in the in-cell touch panel 100 uses the capacitive type, and, as described above, may be formed of the on-cell type or the in-cell type. The touch panel 500 includes a plurality of driving electrodes 510 which are formed in a TFT substrate or a color filter substrate and are formed to be parallel to a plurality of gate lines, and a plurality of receiving electrodes 520 which are formed in a color filter substrate or a TFT substrate and are formed to be parallel to a plurality of data lines.

Here, the driving electrodes 510 are formed between the receiving electrodes 520 in a block shape, and driving electrodes parallel to one gate line are connected to the touch sensing unit 700 through one line. However, a disposition structure of a driving electrode 510 and a receiving electrode which configure the touch panel 500, and a method of connecting the driving electrode and the receiving electrode to the touch sensing unit 700 may be variously changed.

The touch sensing unit 700 drives the touch panel 500 to detect a touch during a touch sensing period in one frame defined by a vertical sync signal (Vsync).

The touch sensing unit 700 detects a touch with a sensing signal (value of a voltage) received from the sensing electrode 520. That is, when a driving pulse is being applied to the driving electrode 510 of the touch panel so as to detect a touch, if a user touches a specific area of the in-cell touch panel 100 with a finger or a pen, a capacitance between a driving electrode 510 and a receiving electrode 520 is changed, and this change of a capacitance changes levels of voltages applied to the touch sensing unit 700 through the receiving electrodes. The receiving electrodes is connected to the touch sensing unit 700, and the touch sensing unit 700 determines a touch by using the changed levels of voltages (sensing signals).

The touch sensing unit 700 may be formed to detect only a touch, and in this case, a sensing signal, which is generated from the touch sensing unit 700 when a touch is being detected, can be processed in a separate touch point detecting unit (not shown) or timing controller 400, and thus, a touch point can be detected. However, the above-described touch sensing unit 700 may be formed to detect a touch and directly detect a touch point.

Particularly, the present invention also uses a touch electrode (driving electrode and receiving electrode), formed for touch sensing, as an electrode that receives the common voltage necessary for driving liquid crystal. Therefore, the touch sensing unit 700 may include a switching part transferring a touch pulse or a common voltage to the touch electrode according to a timing, and a sensing signal receiver receiving a sensing signal transferred through the receiving electrode. The touch sensing unit 700 can be controlled by the driver 600 driving the in-cell touch panel, and particularly, by the timing controller 400 configuring the driver.

Finally, the driver 600 controls various signals applied to the in-cell touch panel 100 and the touch sensing unit 700 such that an image is displayed through the in-cell touch panel 100 during an image output period in one frame and a touch is detected through the touch sensing unit 700 during a touch sensing period in the one frame.

A gate driver 200, a data driver 300 and a timing controller 400, which configures the driver 600 and are shown in FIG. 4, are separated from each other as shown in FIG. 3b, in electronic products such as TV or notebook computers, but may be formed in one chip (Display Diver IC, DIC) as shown in FIG. 3a, in a small electronic products such as smart phones or tablet personal computers. In any case, the gate driver is formed in the in-cell touch panel 100 in the LCD device according to the present invention.

The timing controller 400 configuring the driver 600 generates control signals GCS and DCS for controlling an operation timing of the data driver 300 and the gate driver 200 by using a timing signal, for example, a data enable signal DE, a dot clock DCLK, a vertical sync signal Vsync, a horizontal sync signal Hsync, or the like, inputted from an external system. That is, the timing controller 400 can transfer a gate start signal VST for driving the gate driver 200, a clock signal CLK outputted as a pull-up signal from the gate driver and various driving voltages VDD used in the gate driver 200, to the gate driver 200. The timing controller 400 can generate a source output enable signal SOE and a polarity reversal signal POL for controlling the data driver 300 to transfer the signals to the data driver 400. The functions may be performed in a control signal generator 410 in the timing controller 400.

Moreover, the timing controller 400 realigns an input image data DATA in inputted from an external system to output a realigned image data DATA to the data driver 300. The functions may be performed in a data alignment unit 420 in the timing controller 400.

Moreover, the timing controller 400 controls the data driver 300 and the gate driver 200, and can generate control signals for controlling an input/output operation timing of the touch sensing unit 700 to transfer the signals to the touch sensing unit 700.

The data driver 300 configuring the driver 600 converts the image data DATA inputted from the timing controller into analog data voltages and respectively supplies the data voltages for one horizontal line to the data lines at every one horizontal period where the scan signal (pull-up signal) is supplied to one gate line. That is, the data driver 300 converts image data DATA into data voltages by using gamma voltages supplied from the gamma voltage generator (not shown), and respectively outputs the data voltages to the data lines. To this end, the data driver 300 may include a sampling unit, a latch unit, a digital-to-analog converter, and an output buffer.

The gate driver 200 configuring the driver 600 shifts the gate start signal VST transferred from the timing controller 400, and sequentially supplies a scan signal (pull-up signal) having a gate-on voltage Von to the gate lines. Also, the gate driver 200 supplies a gate-off voltage Voff (pull-down signal) to the gate lines during the other period in which the scan signal (pull-up signal) having a gate-on voltage Von is not inputted to the gate line. Each of switching transistors formed in each of the gate lines turns on according to a pull-up signal, and thus, a data voltage inputted through the data line is charged into each of the pixels, and the switching transistors turn off according to a pull-down signal.

As described above, the gate driver 200 applied to the present invention uses a Gate In Panel (GIP) type, and in this case, the gate control signals for controlling the gate driver 200 may include a gate start signal VST and a clock signal CLK.

A detailed configuration of the gate driver 200 will be described below with reference to FIGS. 5 and 6.

Figure 6:
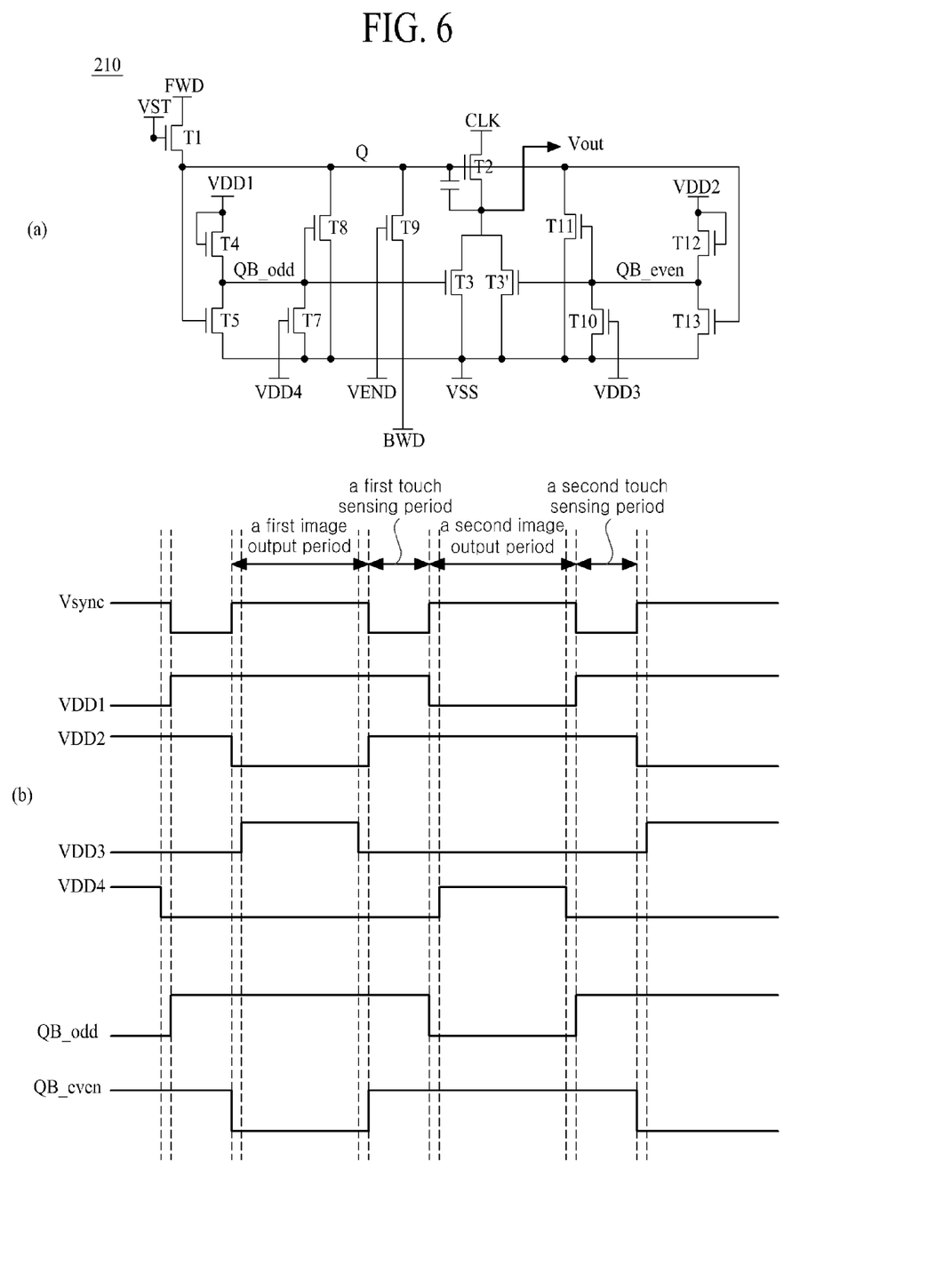
FIG. 6 is an exemplary diagram illustrating a configuration of a stage applied to the gate driver according to the present invention and showing various waveforms which are inputted to or outputted from the stage.

FIG. 6 is an exemplary diagram illustrating a configuration of a stage applied to the gate driver according to the present invention and showing various waveforms which are inputted to or outputted from the stage, and a portion (a) of FIG. 6 illustrates a circuit configuration of a stage and a portion (b) of FIG. 6 illustrates various waveforms.

As shown in FIGS. 5 and 6, the gate driver 200, which sequentially inputs a scan signal (hereinafter referred to as a pull-up signal) having a gate-on voltage Von to each of the gate lines to sequentially charge a data voltage to the gate line, includes a plurality of stages Stage 1 to Stage n including a plurality of Thin Film Transistors TFT. The stages are cascade-connected to each other and sequentially generate output signals Vout1 to Voutn. Here, the output signal Vout may be the above-described pull-up signal or pull-down signal.

Each of the stages includes a plurality of switching circuit charging or discharging a Q-node and QB-node according to a carry signal transferred from a previous stage, another carry signal transferred from a next stage and a clock signal CLK. In other words, each of the output signals Vout1 to Voutn of the stages 210 functions as a pull-up signal applied to gate lines of the LCD display and a carry signal transferred to a previous stage or a next stage. A circuit configuration of a stage configured with N type TFTs is illustrated in a portion (a) of FIG. 6, but a circuit configuration of a stage configured with P type TFTs may have the same configuration as that of a portion (a) of FIG. 6 and may be driven by the same method. Here, a voltage turning on the P type TFT has a polarity opposite to a polarity of a voltage turning on the N type TFT. Also, the number of the clock signal CLK applied to the stage shown in a portion (a) of FIG. 6 is one, but clock signals CLKs equal to or more than 2 may be used for driving the stage. That is, the stage 210 applied to the present invention may be configured in various types of circuits, and driven with various clock signals CLK and driving voltages.

The stage 210 shown in a portion (a) of FIG. 6 according to the embodiment of the present invention includes a Q node for controlling a pull-up transistor T2, a QB_odd node for controlling a first pull-down transistor T3, and a QB_even node for controlling a second pull-down transistor T3'. As described in the related art, a pull-down signal for turning off switching transistors formed in the gate line is continuously supplies to the gate line during the other period when a pull-up signal is not inputted to the gate line, and in this case, if one pull-down transistor continuously inputs the pull-down signal to the gate line, the performance of the pull-down transistor may be reduced. Therefore, in the LCD device according to the present invention, each of the stages 210 basically includes two pull-down transistors T3 and T3', and alternately drives the two pull-down transistors to input the pull-down signal into the gate line in each frame.

That is, the stage 210 applied to the present invention generates pull-down signals inputted to a gate line using two driving voltages VDD1 and VDD2 and two pull-down transistors T3 and T3', and particularly, turns on the two pull-down transistors T3 and T3' to apply a current corresponding to the pull-down signal to the gate line during a touch sensing period in one frame.

To provide an additional description, each of the stages transfers a pull-up signal to a gate line in an image output period in one frame. Also, after the pull-up signal is outputted, the stage turns on a first pull-down transistor or a second pull-down transistor disposed at the stage to transfer a pull-down signal to the gate line during the image output period. Moreover, the stage turns on the first pull-down transistor and the second pull-down transistor to transfer the pull-down signal to the corresponding gate line during a touch sensing period in the one frame.

The features will be described below in detail with reference to FIG. 6.

First, as shown in a portion (b) of FIG. 6, a first driving voltage VDD1 inputted to a first pull-down transistor T3 has a high level, and a second driving voltage VDD2 inputted to a second pull-down transistor T3' has a low level, during a first image output period in one frame defined by a vertical sync signal (Vsync). Therefore, only the first pull-down transistor T3 turns on to transfer a low level of first pull-down signal to a gate line.

Second, if a first touch sensing period comes after a first image output period, the first driving voltage VDD1 and the second driving voltage VDD2 maintains a high level. Therefore, the first pull-down transistor T3 and the second pull-down transistor turn on, and thus, two pull-down signals are transferred to a gate line.

In this case, a voltage applied to a gate line is the same as a voltage applied to a gate line by a pull-down signal generated by one pull-down transistor. However, because a current is inputted to a gate line from the two pull-down transistors, a current flowing through a gate line is greater than a current corresponding to a case in which a pull-down signal generated by one pull-down transistor is applied to a gate line.

In other words, because an amount of a current increases when an amount of a voltage applied to a gate line is being equal to that by one pull-down transistor, a value of a resistance in a gate line relatively decreases. That is, since V=IR, if a current (I) flowing through a gate line increases when a voltage (V) in a gate line is being equal to that by one pull-down transistor, a value of a resistance decreases.

As a resistance of a gate line decreases, characteristic for maintaining a specific voltage in a gate line increases. Therefore, even though a coupling capacitance (a capacitance in a gate line) CGL between a gate line and a driving electrode 510 or a receiving electrode 520 exists, an extra charge transferred from the driving electrode 510 to the receiving electrode 520 through a gate line decreases. Therefore, a noise penetrating into the touch sensing unit 700 decreases, and finally, a touch determination function of the touch sensing unit 700 can be enhanced.

Third, if a second image output period comes after a first touch sensing period, the first pull-down transistor T3 and the second pull-down transistor T3 alternate. That is, a first driving voltage VDD1 inputted to a first pull-down transistor T3, as shown in a portion (b) of FIG. 6, has a low level, and a second driving voltage VDD2 inputted to a second pull-down transistor T3' has a high level. Therefore, only the second pull-down transistor T3' turns on to transfer a low level of second pull-down signal to a gate line.

Fourth, if a second touch sensing period comes after the second image output period, the first driving voltage VDD1 and the second driving voltage VDD2 again maintains a high level. Therefore, the first pull-down transistor T3 and the second pull-down transistor turn on during the second touch sensing period similarly to the first touch sensing period, and thus, two pull-down signals are transferred to a gate line.

As described above, the LCD device according to the present invention turns on two pull-down transistors to supply a pull-down signal to a gate line during a touch sensing period in each frame. Therefore, pull-down transistors driven during a touch sensing period in each frame are the same. Thus, a characteristic change in a circuit due to a characteristic difference in transistors used for a touch sensing period does not occur in a gate line. In this way, when characteristic of a gate line, and particularly, resistance characteristic is not changed, an amount of an extra charge transferred from the electrode to the receiving electrode through a gate line does not change, and thus, a touch determination function of the touch sensing unit 700 can be enhanced.

That is, in the above-described present invention, a polarity of a first driving voltage VDD1 for turning on the first pull-down transistor T3 differs from a polarity of a second driving voltage for turning on the second pull-down transistor, during the image output period, and the first driving voltage VDD1 and the second driving voltage VDD2 are respectively inputted to the first pull-down transistor T3 and the second pull-down transistor T3' to alternately turn on one of the first pull-down transistor T3 and the second pull-down transistor T3' during the image output period. Also, the polarity of the first driving voltage for turning on the first pull-down transistor is the same as the polarity of the second driving voltage for turning on the second pull-down transistor, during the touch sensing period, and thus, the first driving voltage VDD1 and the second driving voltage VDD2 are respectively inputted to the first pull-down transistor T3 and the second pull-down transistor T3' to turn on the first pull-down transistor T3 and the second pull-down transistor T3' during the image output period.

To this end, each of polarities of the first driving voltage VDD1 and the second driving voltage can change in a rising point or a falling point of a vertical sync signal (Vsync).

Each of the stages 210 applied to the present invention can further include a first assistant transistor T7 driven with a first assistant driving voltage VDD4 and a second assistant transistor T10 driven with a second assistant driving voltage VDD3 so as to accurately perform a function of turning on or off the first pull-down transistor T3 and the second pull-down transistor T3'.

That is, each of the stages 210 can further include a first assistant transistor T7 turning off with a first assistant driving voltage VDD4 for the first pull-down transistor T3 to be turned on by the first driving voltage VDD1 when the first pull-down transistor T3 is turned on, turning on with the first assistant driving voltage VDD4 for the turn-off state of the first pull-down transistor T3 to be maintained when the first pull-down transistor T3 is turned off during the image output period, and turning off with the first assistant driving voltage VDD4 for the first pull-down transistor T3 to be turned off with the first driving voltage VDD1 during the touch sensing period. Also, each of the stages 210 can further include a second assistant transistor T10 turning on or off with a second assistant driving voltage VDD3 having a polarity opposite to a polarity of the first assistant driving voltage VDD4 for the second pull-down transistor T3' to be turned off or on with the second driving voltage VDD2 during the image output period, and turning off with the second assistant driving voltage VDD3 having the same polarity as a polarity of the first assistant driving voltage VDD3 for the second pull-down transistor T3' to be turned on with the second driving voltage VDD2 during the touch sensing period.

Functions of the first assistant transistor T7 and the second assistant transistor T10 will be described below in detail with reference to FIG. 6.

First, as shown in FIG. 6, because the first pull-down transistor T3 turns on, and the second pull-down transistor R3' turns off, the first assistant driving voltage VDD4 having a low level is inputted to the first assistant transistor T7, and the second assistant driving voltage VDD3 having a high level is inputted to the second assistant transistor T10, during the first image output period.

That is, because the first assistant driving voltage VDD4 has a low level, the first assistant transistor T7 turns off Therefore, the first pull-down transistor T3 turns on with the high-level first driving voltage VDD1 to transfer the first pull-down signal to a gate line.

At this point, because the second assistant driving voltage has a high level, the second assistant transistor turns off. In this case, a node between the second assistant transistor T10 and a eleventh transistor T11 connects to a low potential voltage node, and a low potential voltage VSS is inputted to a gate node of the second pull-down transistor T3'. Therefore, even though a leakage current occurs in a twelfth transistor T12 which has to turn off with the second driving voltage VDD2, a low potential voltage VSS is inputted to a gate node of the second pull-down transistor T3', and thus, a turn-off state of the second pull-down transistor T3' is maintained.

Accordingly, even though a leakage current occurs in a twelfth transistor T12 to which the second driving voltage is inputted, the second pull-down transistor T3' does not turn on, and only the first pull-down transistor T3 turns on with the high-level first driving voltage VDD1, and thus, only the first pull-down signal can be outputted to a gate line.

That is, a polarity of the first assistant driving voltage VDD4 differs from a polarity of a second assistant driving voltage VDD3, during the first image output period, and the first assistant driving voltage VDD4 and the second assistant driving voltage VDD3 are respectively inputted to the first assistant transistor T7 and the second assistant transistor T10 during the first image output period. Each of the polarities of the first assistant driving voltage VDD4 and the second assistant driving voltage VDD3, as shown in a portion (b) of FIG. 6, can change during an image output period.

Second, if a first touch sensing period comes after a first image output period, the first assistant driving voltage VDD4 and the second assistant driving voltage VDD3, each of which has a low level, are respectively inputted to the first assistant transistor T7 and the second assistant transistor T10 to turn on the first assistant transistor T7 and the second assistant transistor T10.

Therefore, the first pull-down transistor T3 and the second pull-down transistor T3' turn on with the high-level first driving voltage VDD1 and the high-level second driving voltage to output the first pull-down signal and the second pull-down signal to a gate line.

Third, if a second image output period comes after a first touch sensing period, the first pull-down transistor T3 has to turn off and the second pull-down transistor T3' has to turn on. Therefore, the first assistant driving voltage VDD4 having a high level is inputted to the first assistant transistor T7, and the second assistant driving voltage VDD3 having a low level is inputted to the second assistant transistor T10.

Accordingly, even though a leakage current occurs in a first transistor T1 to which the first driving voltage is inputted, the first pull-down transistor T3 does not turn on, and only the second pull-down transistor T3' turns on with the high-level second driving voltage VDD2, and thus, only the second pull-down signal can be outputted to a gate line.

Fourth, if a second touch sensing period comes after the second image output period, the first pull-down transistor T3 and the second pull-down transistor T3' turn on with the first driving voltage VDD 1 and the second driving voltage VDD2, each of which has a high level, irrespective of the first assistant driving voltage VDD4 and the second assistant driving voltage VDD3, and thus, output the first pull-down signal and the second pull-down signal to a gate line, by using the method described above in the second process.

That is, the first assistant transistor T7, the first driving voltage VDD4, the second assistant transistor T10 and the second driving voltage VDD3 input a low potential voltage VSS to a gate node of the first pull-down transistor T3 or the second pull-down transistor T3' when the first pull-down transistor T3 or the second pull-down transistor T3' has to turn off, and thus, accurately turn off the first pull-down transistor T3 or the second pull-down transistor T3'.

FIGS. 7 to 10 are exemplary diagrams for describing a method of driving the LCD device according to the present invention. Hereinafter, a detailed explanation for the same parts described above will be not provided or will be described in brief.

Figure 7:
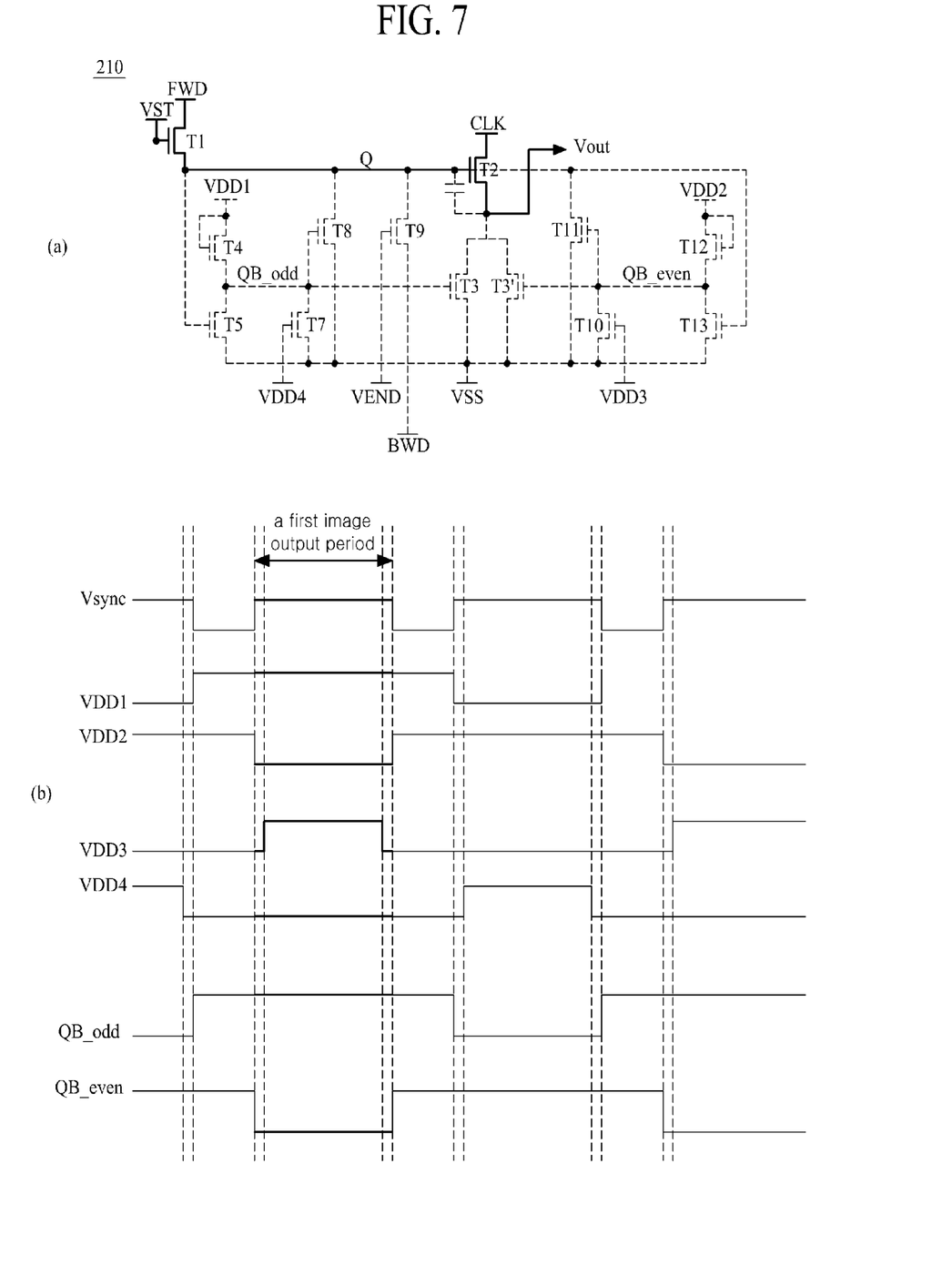
FIGS. 7 to 10 are exemplary diagrams for describing a method of driving the LCD device according to the present invention.

First, FIG. 7 illustrates a state in which the stage 210 transfers a pull-up signal to a gate line during a first image output period in a first frame.

If the first transistor T1 turns on with a gate start signal VST, a high level signal is inputted to a gate node of the pull-up transistor T2 through the Q node. Therefore, the pull-up transistor T2 turns on, and a clock signal CLK inputted to the pull-up transistor T2 is outputted as a pull-up signal Vout to a gate line through an output node.

In this case, a data voltage transferred through each of data lines is charged into each of pixels corresponding to the gate line, and thus, an image is displayed through the pixels.

Figure 8:
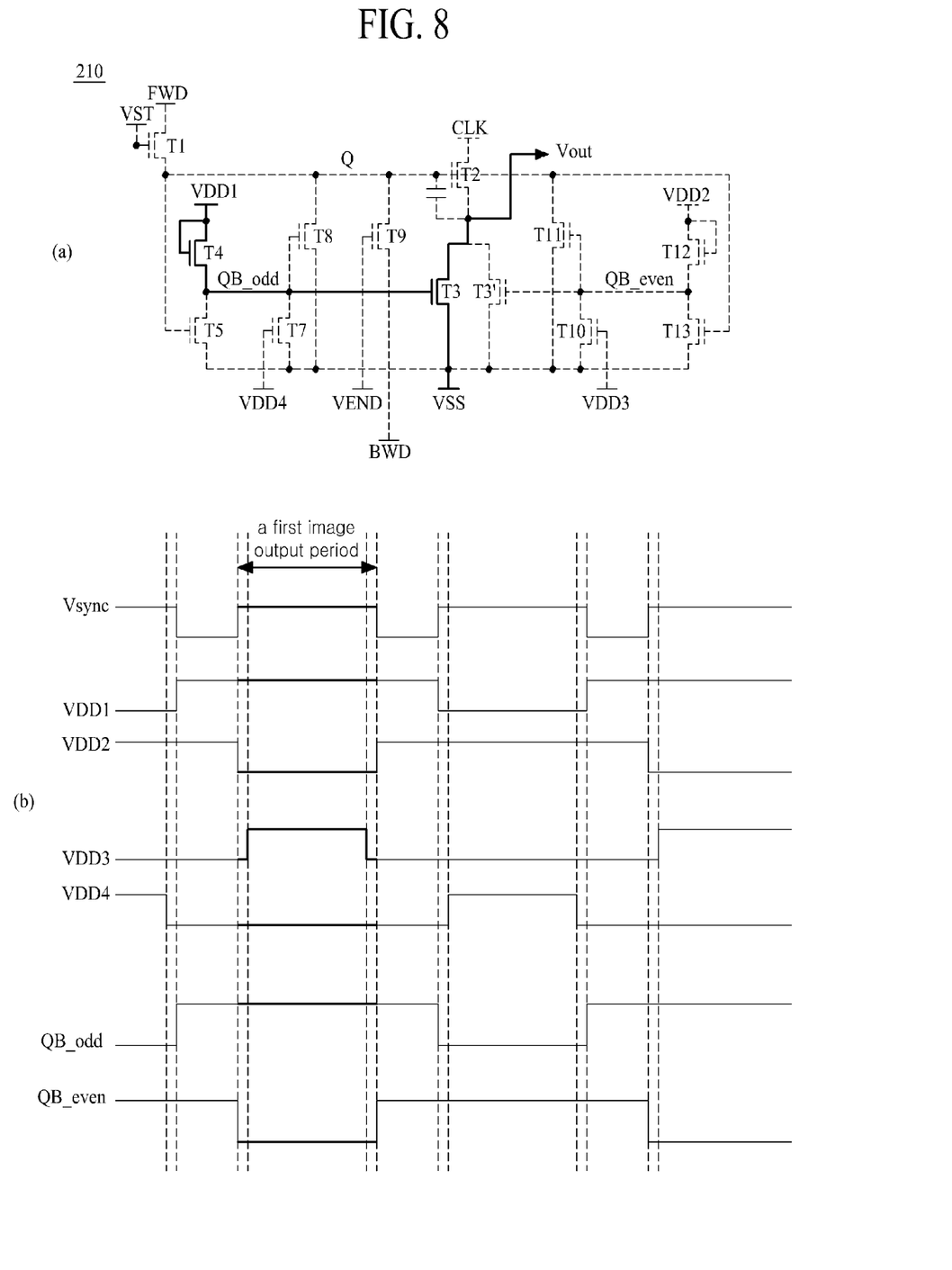

Next, FIG. 8 illustrates a state in which a first pull-down signal is outputted to a gate line with a first pull-down transistor T3 turning on according to a first driving voltage VDD 1 during the first image output period in the first frame.

As the gate start signal VST is changed to a low level, the pull-up transistor T2 turns off to block the pull-up signal, and the high-level first driving voltage VDD1 is inputted to a gate node of the fourth transistor T4. Therefore, a high level signal is inputted to a gate node of the first pull-down transistor T3 through a QB_odd node to turn off the first pull-down transistor T3. Accordingly, the first pull-down signal is outputted to a gate line through the first pull-down transistor T3.

At this point, because the second driving voltage VDD2 has a low level, a twelfth transistor T12 turns off. Therefore, because the second pull-down transistor T3' does not turn on, the second pull-down signal is not outputted through the second pull-down transistor T3'.

In this case, even though a leakage current occurring through the twelfth transistor T12 is inputted to the second pull-down transistor T3', the second pull-down transistor T3' does not turn on, by making a second assistant driving voltage VDD3 turn on a second assistant transistor T10 to input a low potential voltage VSS to a gate node of the second pull-down transistor T3'. Therefore, only the first pull-down signal occurring in the first pull-down transistor T3 can be outputted to a gate line.

Figure 9:
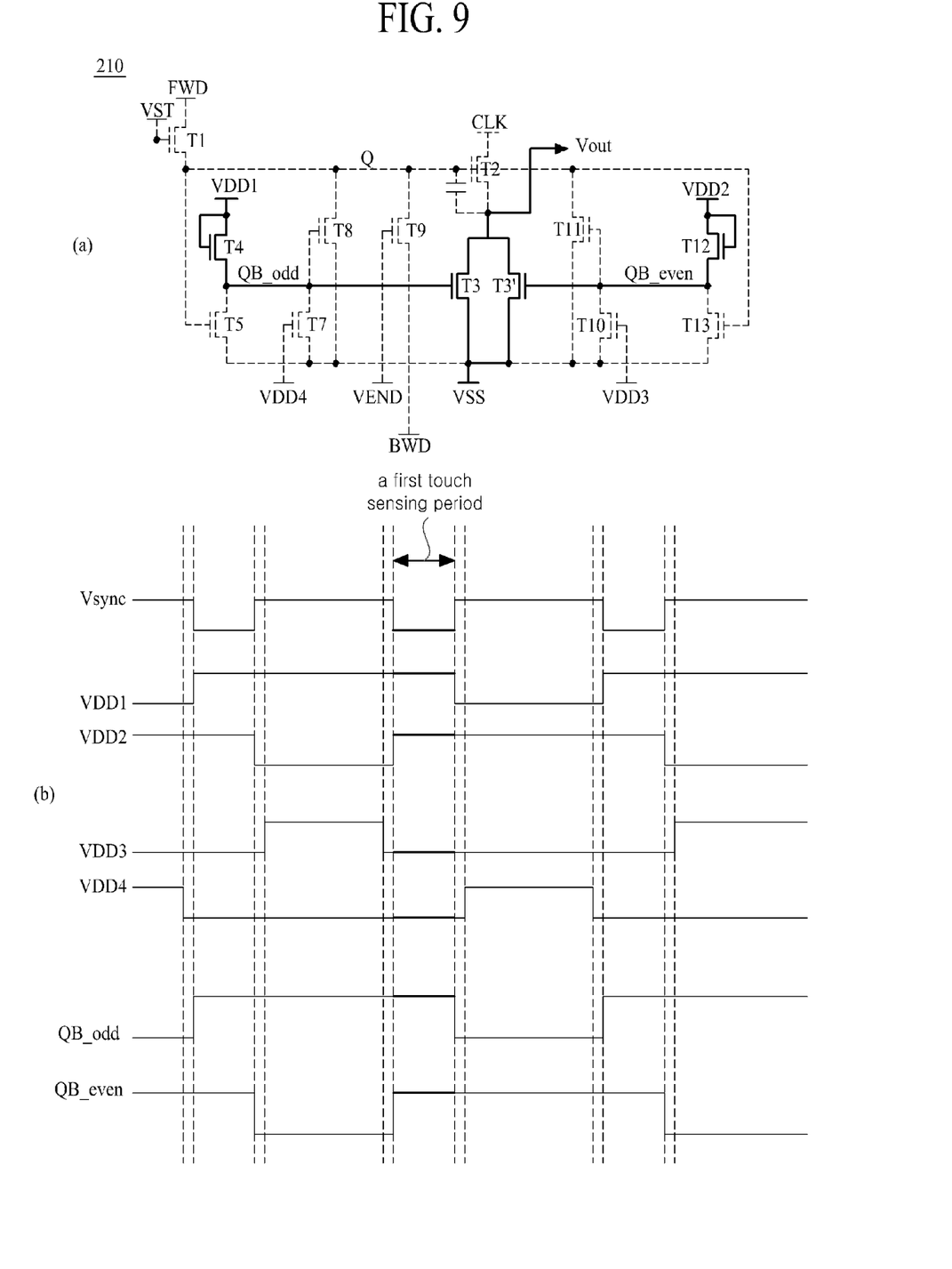

Next, FIG. 9 illustrates a state in which a first pull-down signal and a second pull-down signal are outputted to a gate line through the first pull-down transistor T3 and the second pull-down transistor T3' which turn on with the first driving voltage VDD1 and the second driving voltage VDD2, during a first touch sensing period in the first frame.

Because the first driving voltage VDD1 and the second driving voltage VDD2 with a high level are inputted to the first pull-down transistor T3 and the second pull-down transistor T3', the first pull-down transistor T3 and the second pull-down transistor T3' turn on, and thus, a first pull-down signal and a second pull-down signal are outputted to a gate line through the first pull-down transistor T3 and the second pull-down transistor T3'.

At this point, the touch sensing unit 700 applies a touch pulse to the driving electrode 510 and determines a touch using a sensing signal received through the receiving electrode 520.

In this case, when a constant voltage in a gate line is being maintained, currents outputted through the first pull-down transistor T3 and the second pull-down transistor T3' are inputted to a gate line, and thus, a value of a resistance in a gate line decreases. Therefore, the first limitation described in the related art can be solved.

Figure 10:
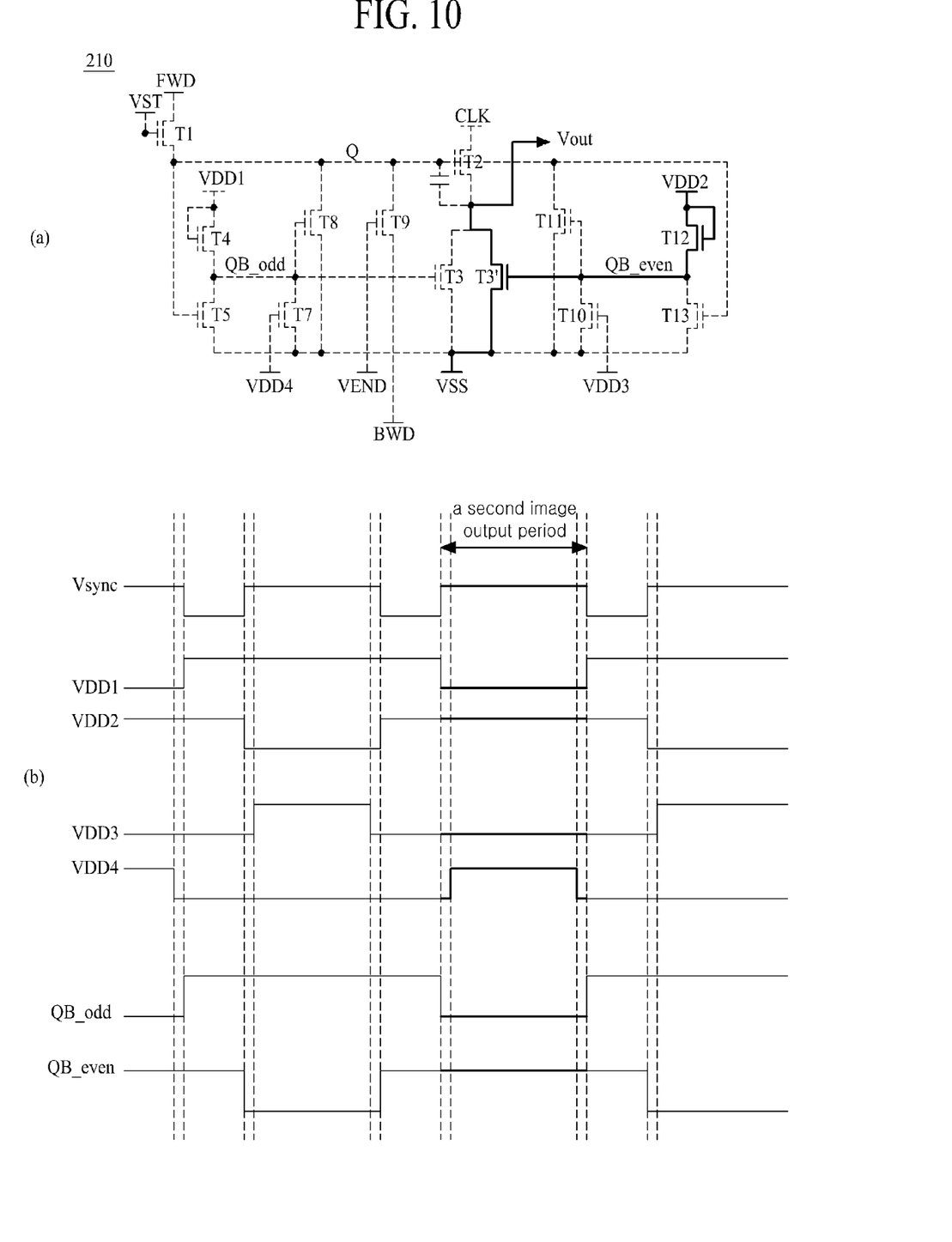

Next, FIG. 10 illustrates a state in which a second pull-down signal is outputted to a gate line through a second pull-down transistor T3' turning on with a second driving voltage VDD2.

That is, the FIG. 10 illustrates a state in which each of the polarities of the first driving voltage VDD1 and the second driving voltage VDD2 described with reference to FIG. 8 is changed to a opposite polarity. In other words, the first pull-down signal is outputted to a gate line through the first pull-down transistor T3 turning on with the first driving voltage VDD1 having a high level in FIG. 8, but the second pull-down signal is outputted to a gate line through the second pull-down transistor T3' turning on with the second driving voltage VDD2 having a high level in FIG. 10.

At this point, because a low potential voltage VSS is inputted to a gate node of the first pull-down transistor T3 with a first assistant driving voltage VDD4, a turn-off state of the first pull-down transistor T3 is maintained in any case.

Finally, even though it is not shown in drawings, a second touch sensing period in a second frame comes after the second image output period in the second frame, and in this case, the process described with reference to FIG. 9 is repeated again.

That is, in the first touch sensing period and the second touch sensing period, the first pull-down transistor T3 and the second pull-down transistor T3' turn on to output the first pull-down signal and the second pull-down signal to a gate line.

Therefore, because the pull-down transistor turning on during each of touch sensing periods does not change in every touch sensing periods, a characteristic change in a circuit due to a characteristic difference in transistors used for a touch sensing period does not occur in a gate line. Therefore, the second limitation described in the related art can be solved.

A summary on the method of driving the LCD device according to the present invention will now be described.

In a first step, a stage corresponding to each of a plurality of gate lines transfers a pull-up signal to a gate line formed in an in-cell touch panel during an image output period in one frame. After the pull-up signal is outputted during the image output period, the stage turns on a first pull-down transistor or a second pull-down transistor formed in the stage to transfer a pull-down signal to the gate line during the image output period.

In a second step, a touch sensing unit detects a touch by using a touch electrode formed in the in-cell touch panel while the stage turns on the first pull-down transistor and the second pull-down transistor to transfer the pull-down signal to the corresponding gate line, during a touch sensing period in the one frame. Here, the stages sequentially transfer the pull-up signal to the respective gate lines.

Here, a polarity of a first driving voltage VDD1 for turning on the first pull-down transistor T3 differs from a polarity of a second driving voltage VDD2 for turning on the second pull-down transistor T3', during the image output period. Also, the polarity of the first driving voltage VDD1 for turning on the first pull-down transistor T3 is the same as the polarity of the second driving voltage VDD2 for turning on the second pull-down transistor T3', during the touch sensing period.

Moreover, in the processes, the pull-up signal turns on switching transistors connecting to each gate line to charge a data voltage transferred through each of data lines into each of pixels. Also, the pull-down signal turns off the switching transistors.

Here, each of the first step and the second step may be subdivided into the following steps.

The first step includes transferring, by a stage receiving a start signal among the stages, the pull-up signal to the gate line to display an image during one horizontal period of the image output period, and turning on, by the stage, the first pull-down transistor or the second pull-down transistor to transfer the pull-down signal to the gate line to turn off the switching transistors connected to the gate line, during the other period of the image output period after the one horizontal period.

The second step includes respectively inputting, by each of the stages, the first driving voltage and the second driving voltage to the first pull-down transistor and the second pull-down transistor during the touch sensing period, the first and second driving voltages having the same polarity, turning on, by each of the stages, the first pull-down transistor and the second pull-down transistors to transfer the pull-down signals to each of the gate lines, and inputting, by the touch sensing unit, a driving pulse to the touch electrode and detecting whether the in-cell touch panel is touched by using a sensing signal transferred from the touch electrode, when a plurality of the pull-down signals are being applied to the respective gate lines.

The method of driving the LCD device according to the present invention, as described above, can turn on one of the first pull-down transistor T3 and the second pull-down transistor T3' by using the first assistant driving voltage VDD4, the first assistant transistor T7, the second driving voltage VDD3 and the second assistant transistor T10, during the image output period.

To this end, the method of driving the LCD device according to the present invention may further include receiving, by each of the stages, an assistant driving voltage to turn on one of the first pull-down transistor T3 and the second pull-down transistor T3', during the image output period, and receiving, by each of the stages, the assistant driving voltage to turn on all of the first pull-down transistor T3 and the second pull-down transistor T3', during the touch sensing period.

Here, in the receiving an assistant driving voltage to turn on one of the first pull-down transistor T3 and the second pull-down transistor T3', when the first pull-down transistor T3 is turned on, a second assistant driving voltage is inputted to a second assistant transistor connected to a gate of the second pull-down transistor for turning off the second pull-down transistor, and when the second pull-down transistor is turned on, a first assistant driving voltage is inputted to a first assistant transistor connected to a gate of the first pull-down transistor for turning off the first pull-down transistor, during the image output period.

Moreover, in the receiving the assistant driving voltage to turn on all of the first pull-down transistor T3 and the second pull-down transistor T3', the first assistant driving voltage and the second assistant driving voltage are respectively inputted to the first assistant pull-down transistor and the second assistant pull-down transistor for the first pull-down transistor and the second pull-down transistor to be turned on by the first driving voltage and the second driving voltage, during the touch sensing period. Here, the first and second assistant driving voltages have the same polarity.

According to the above-described present invention, because the first pull-down transistor T3 and the second pull-down transistor T3' are simultaneously driven, a higher current flows into a gate line, and thus, a value of a resistance in a gate line decreases. Therefore, the touch sensitivity may be enhanced.

Moreover, since the first pull-down transistor T3 and the second pull-down transistor T3' are simultaneously driven, a touch sensitivity difference (caused by a resistance deviation of the first pull-down transistor T3 and the second pull-down transistor T3') between the first driving voltage VDD1 and the second driving voltage VDD2 can be removed in each period.

As described above, the present invention optimizes WRGB data, thus decreasing the capacity of the internal memories (internal SRAMs) 423 and 425 and reducing the frequency of the external memory 500. Accordingly, according to the present invention, the external memory 500 can stably operate with a sufficient frequency margin, namely, a frequency margin between 340 MHz and 400 MHz.

As described above, the present invention alternately transfers the pull-down signals generated by different pull-down transistors to the gate lines during the image output period, turns on the different pull-down transistors to transfer the pull-down signals to the gate lines during the touch sensing period, and thereby can decrease the resistances of the gate lines, thus reducing the extra charge transferred from the driving electrode to the receiving electrode through the gate lines. Therefore, the noise penetrating into the sensing signal receiver of the touch sensing unit can decrease, thus enhancing the touch determination function of the touch sensing unit.

Moreover, the present invention turns on the two full-down transistors that are alternately driven, during the touch sensing period. That is, the resistance characteristic of each gate line is not changed, thus enabling the touch sensing unit to more stably determine whether there is a touch.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of driving a liquid crystal display (LCD) device, the method comprising:
    transferring, by a stage corresponding to each of a plurality of gate lines, a pull-up signal to a corresponding gate line formed in an in-cell touch panel during an image output period in one frame and, after the pull-up signal is outputted during the image output period, turning on a first pull-down transistor or a second pull-down transistor to transfer a pull-down signal to the gate line; and
    detecting, by a touch sensing unit, a touch by using a touch electrode formed in the in-cell touch panel while the stage turns on the first pull-down transistor and the second pull-down transistor to transfer the pull-down signal to the corresponding gate line, during a touch sensing period in the one frame, wherein, the stages sequentially transfer the pull-up signal to the respective gate lines; and wherein a polarity of a first driving voltage transferred to the first pull-down transistor differs from a polarity of a second driving voltage transferred to the second pull-down transistor, during the image output period, and the polarity of the first driving voltage transferred to the first pull-down transistor is the same as the polarity of the second driving voltage transferred to the second pull-down transistor, during the touch sensing period.

2. The method of claim 1, wherein, the pull-up signal turns on switching transistors connected to the gate line, and the pull-down signal turns off the switching transistors.

3. The method of claim 1, wherein the transferring of the pull-up signal and the pull-down signal comprises:

transferring, by a stage receiving a start signal among the stages, the pull-up signal to the gate line to display an image during one horizontal period of the image output period; and turning on, by the stage, the first pull-down transistor or the second pull-down transistor to transfer the pull-down signal to the gate line to turn off switching transistors connected to the gate line, during the other period of the image output period after the one horizontal period.

4. The method of claim 1, wherein the detecting of a touch comprises:

respectively inputting, by each of the stages, the first driving voltage and the second driving voltage to the first pull-down transistor and the second pull-down transistor during the touch sensing period, the first and second driving voltages having the same polarity;

turning on, by each of the stages, the first pull-down transistor and the second pull-down transistors to transfer the pull-down signals to each of the gate lines; and inputting, by the touch sensing unit, a driving pulse to the touch electrode and detecting whether the in-cell touch panel is touched by using a sensing signal transferred from the touch electrode, when a plurality of the pull-down signals are being applied to the respective gate lines.

5. The method of claim 1, further comprising:

receiving, by each of the stages, an assistant driving voltage to turn on one of the first pull-down transistor and the second pull-down transistor, during the image output period; and receiving, by each of the stages, the assistant driving voltage to turn on all of the first pull-down transistor and the second pull-down transistor, during the touch sensing period.

6. The method of claim 5, wherein, in the receiving an assistant driving voltage to turn on one of the first pull-down transistor and the second pull-down transistor, when the first pull-down transistor is turned on, a second assistant driving voltage is inputted to a second assistant transistor connected to a gate of the second pull-down transistor for turning off the second pull-down transistor, and when the second pull-down transistor is turned on, a first assistant driving voltage is inputted to a first assistant transistor connected to a gate of the first pull-down transistor for turning off the first pull-down transistor, during the image output period, and in the receiving the assistant driving voltage to turn on all of the first pull-down transistor, and the second pull-down transistor, the first assistant driving voltage and the second assistant driving voltage are respectively inputted to the first assistant pull-down transistor and the second assistant pull-down transistor for the first pull-down transistor and the second pull-down transistor to be turned on by the first driving voltage and the second driving voltage, during the touch sensing period, the first and second assistant driving voltages having the same polarity.

7. A Liquid Crystal Display (LCD) device, comprising:

an in-cell touch panel with a built-in touch panel;

a gate driver formed in the in-cell touch panel, comprising a plurality of stages respectively corresponding to a plurality of gate lines formed in the in-cell touch panel, and sequentially transferring a plurality of pull-up signals to the respective gate lines during an image output period in one frame;

a touch sensing unit driving the touch panel to detect whether there is a touch, during a touch sensing period in the one frame; and a timing controller controlling the gate driver and the touch sensing unit, wherein, each of the stages transfers a pull-up signal to a corresponding gate line during the image output period, and transfers a pull-down signal to the corresponding gate line by turning on a first pull-down transistor or a second pull-down transistor after the pull-up signal is outputted, during the image output period; and each of the stages turns on the first pull-down transistor and the second pull-down transistor to transfer a pull-down signal to a corresponding gate line during the touch sensing period, wherein a polarity of a first driving voltage transferred to the first pull-down transistor differs from a polarity of a second driving voltage for turning on the second pull-down transistor, during the image output period, and the polarity of the first driving voltage transferred to the first pull-down transistor is the same as the polarity of the second driving voltage for turning on the second pull-down transistor, during the touch sensing period.

8. The LCD device of claim 7, wherein each of the stages comprises:

a first assistant transistor turning off with a first assistant driving voltage for the first pull-down transistor to be turned on by the first driving voltage when the first pull-down transistor is turned on, turning on with the first assistant driving voltage for the turn-off state of the first pull-down transistor to be maintained when the first pull-down transistor is turned off during the image output period, and turning off with the first assistant driving voltage for the first pull-down transistor to be turned off with the first driving voltage during the touch sensing period; and a second assistant transistor turning on or off with a second assistant driving voltage having a polarity opposite to a polarity of the first assistant driving voltage for the second pull-down transistor to be turned off or on with the second driving voltage during the image output period, and turning off with the second assistant driving voltage having the same polarity as a polarity of the first assistant driving voltage for the second pull-down transistor to be turned on with the second driving voltage during the touch sensing period.

* * * * *